United States Patent
Feldman et al.

(10) Patent No.: US 8,484,100 B2
(45) Date of Patent: Jul. 9, 2013

(54) METHOD, MEDIUM, AND SYSTEM FOR AN INTEGRATED APPLICATION STORE FOR A USER DEVICE

(75) Inventors: Daniel I. Feldman, San Francisco, CA (US); Jean-Pierre Ciudad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 13/009,736

(22) Filed: Jan. 19, 2011

(65) Prior Publication Data

US 2012/0095878 A1   Apr. 19, 2012

Related U.S. Application Data (60) Provisional application No. 61/394,724, filed on Oct. 19, 2010.

(51) Int. Cl.
*G06Q 30/00* (2012.01)

(52) U.S. Cl.
USPC ........................................ 705/27.1

(58) Field of Classification Search
USPC ........... 705/26.1, 27.1; 707/999.101, 999.102
See application file for complete search history.

(56) References Cited

U.S. PATENT DOCUMENTS

| | | | |
|---|---|---|---|
| 7,409,405 B1 * | 8/2008 | Masinter et al. | 1/1 |
| 2006/0059174 A1 * | 3/2006 | Mese et al. | 707/100 |
| 2007/0294256 A1 * | 12/2007 | Averett et al. | 707/10 |
| 2009/0064055 A1 * | 3/2009 | Chaudhri et al. | 715/863 |
| 2009/0131115 A1 | 5/2009 | Kretz | |
| 2009/0307105 A1 | 12/2009 | Lemay et al. | |
| 2010/0299187 A1 | 11/2010 | Duggal | |

OTHER PUBLICATIONS http://iffles.com/2010/02/10/introduction-to-using-ufraw-to-edit-raw-files/ (dated Feb. 10, 2010).*

* cited by examiner

*Primary Examiner* — Matthew Zimmerman
(74) *Attorney, Agent, or Firm* — Schwegman Lundberg & Woessner, P.A.

(57) ABSTRACT

Methods, systems and machine readable tangible storage media that integrate an application store in a user device. In one embodiment, a selected document that cannot be used as selected triggers a request to an application store server to determine an availability of applications to use the document as selected. The user device enhances the display of the document selection interface to allow the user to display an application store interface to purchase the application. The purchased application is downloaded and installed on the user device, and the user is optionally apprised of the progress of the purchase with an animated icon representing the application "flying" from the application store interface and "landing" in a dock area within the display on the user device when ready for subsequent launch. Other embodiments are also described.

15 Claims, 9 Drawing Sheets

*APPLICATION STORE SERVER OVERVIEW - 500*

IN AN APPLICATION STORE SERVER, INITIATE APPLICATION SERVICES IN RESPONSE TO RECEIVING INQUIRY FROM A USER DEVICE FOR AVAILABILITY OF APPLICATION TO PURCHASE FOR A DOCUMENT THAT CANNOT BE USED AS SELECTED ON THE USER DEVICE, E.G. AN "UNKNOWN" DOCUMENT TYPE — 501

LOOKUP DOCUMENT TYPE TO DETERMINE IF ONE OR MORE APPLICATIONS SUITABLE FOR THE USER DEVICE IS AVAILABLE TO PURCHASE — 502

INSTRUCT USER DEVICE TO DISPLAY THE APPLICATION STORE OPTION ON THE DEVICE'S DOCUMENT SELECTION INTERFACE TO ALLOW USER TO PURCHASE AN APPLICATION — 503

AWAIT USER SELECTION OF APPLICATION STORE OPTION ON THE USER DEVICE — 504

METHOD, MEDIUM, AND SYSTEM FOR AN INTEGRATED APPLICATION STORE FOR A USER DEVICE

CROSS-REFERENCE TO RELATED APPLICATIONS

This application claims the benefit of an earlier filed provisional application, Application Ser. No. 61/394,724 filed on Oct. 19, 2010 entitled INTEGRATED APPLICATION STORE FOR A USER DEVICE.

BACKGROUND OF THE INVENTION

Modern data processing systems, such as a Macintosh computer running the Macintosh operating system, or a mobile computing device, such as an iPhone running the mobile operating system iOS, can launch an application by activating a file that is usable with the application. The file is in a file system maintained by the data processing system or mobile computing device, and may be a document or other type of data or content, such as a word processing document, spreadsheet, PDF file or media file, etc.

Sometimes, however, the operating system is not able to launch an application because the operating system cannot determine which application to use. For example, the file may be of a type that is unknown to the operating system because there is no application currently installed on the system or device with which the file may be used.

SUMMARY OF THE DESCRIPTION

Methods, machine readable tangible storage media, and data processing systems that can present a user with available applications to purchase for use with a document on their data processing system or mobile computing device are described. In the description that follows, a data processing system or mobile computing device are collectively referred to as a user device, and a file which may be a document or other type of data or content, such as a word processing document, spreadsheet, PDF file or media file, etc. is simply referred to as a document.

In one embodiment, an application store is integrated with or available through the file system maintained on the user device. The application store can facilitate the purchase of applications for download and installation on the user device whenever a document is encountered that is not usable or not completely usable with the applications already installed, such as when a new or updated application is needed in order to successfully use the document.

In one embodiment, responsive to a user's selection of or other attempt to activate a document, the user device determines that the document is not usable or not completely usable with the applications already installed on the device. The user device can launch a background process to communicate with the application services of an application store server to initiate a lookup to a database of available applications indexed by one or more of a file extension, document type or uniform type identifier to determine the availability of applications to purchase for use with the document. In one embodiment, the lookup to the database will determine the availability of applications to purchase based on the capabilities of user device, including restricting the available applications returned from the lookup to only those that match the capabilities of that device.

In one embodiment, responsive to the lookup and a determination that applications are available to purchase or otherwise obtain for use with the document, the user device operates in conjunction with the file system or other subsystem of the operating system to automatically present the user of the user device with a navigable path to the application store. For example, for user devices running the Macintosh operating system, the user is presented on the display area of the device with a document selection interface that has been modified to include an application store option. The application store option, such as a button or other selectable control that, when activated, will present the user with an application store interface populated with the results of the lookup. The results of the lookup include a list of applications that are available to purchase or otherwise obtain for use with the document that triggered the lookup. The lookup can be triggered in response to the user's selection of a button or other user selectable control or can be triggered automatically in response to determining that the document is not usable or not completely usable with the applications already installed on the device.

In one embodiment, the navigable path to the application store will vary depending on the context of the user's selection of or attempt to activate the document. For example, in a user device running the Macintosh operating system, the user may have activated the document by selecting an icon (e.g. double clicking or double tapping on the icon) representing the document while in the Finder application. In a user device running the Windows operating system, the user may have activated the document by selecting a document in a folder presented while browsing documents using the Windows file explorer interface. If the document is a type that is unknown, a document selection interface alerting the user to the status of the unknown document type is presented, typically in a pop-up window that is modified to include the application store option. The application store option, such as a button labeled "Check Store," will enable the user to navigate to the application store interface to browse and purchase available applications usable with the document.

In one embodiment, responsive to the user selecting the application store option presented on the modified document selection interface, the user is presented with the application store interface pre-populated with the results of the lookup, such as a list of applications that are available to purchase for use with the document that triggered the lookup. The application store interface communicates with the application store server to initiate application services including initiating a rank of the list of available applications for purchase returned by the lookup. The rank of the list of available applications for purchase is performed using ranking data obtained from the application store database. The ranking data may include the file extensions, document types, and uniform type identifiers (UTIs) associated with the applications returned by the lookup.

In one embodiment, the application store server accesses the database to map a particular file extension or document type of the document with the corresponding UTI in order to rank the applications by information maintained in the UTI, such as the owner of the application and the level of support for the document provided by the application, such as read only, read/write, import, view, etc. The display of the results of the lookup is arranged to reflect the relative ranking of the applications available for purchase. The relative ranking facilitates the user's selection of which application to purchase or otherwise obtain through the application store interface.

In one embodiment, responsive to selecting an available application to purchase, the application store interface operates in conjunction with the application server to initiate the install and download application services of the application server, and to control the user device display area with a user-friendly animation of the download and installation process. For example, in a user device running the Macintosh operating system, the application store interface operates in conjunction with the display system of the user device to show an icon representing the application in the application store interface being moved to the program control area of the user device, where the icon may be selected by the user to activate the document using the newly purchased application. For example, in a user device running the Macintosh operating system, the icon representing the application is animated to appear as though it is "flying" across the display area of the user device and "landing" with a bounce on the document control area or Dock when the download and installation is complete. In one embodiment, the status of the download and install processes is further visually conveyed to the user through the use of a status bar or varying levels of transparency of the application icon appearing in the document control area. Details of the download and installation animation of the application icon in the application store interface and program control area are described in the co-pending published application Ser. No. 09/191,334.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2011.

Figure 1:
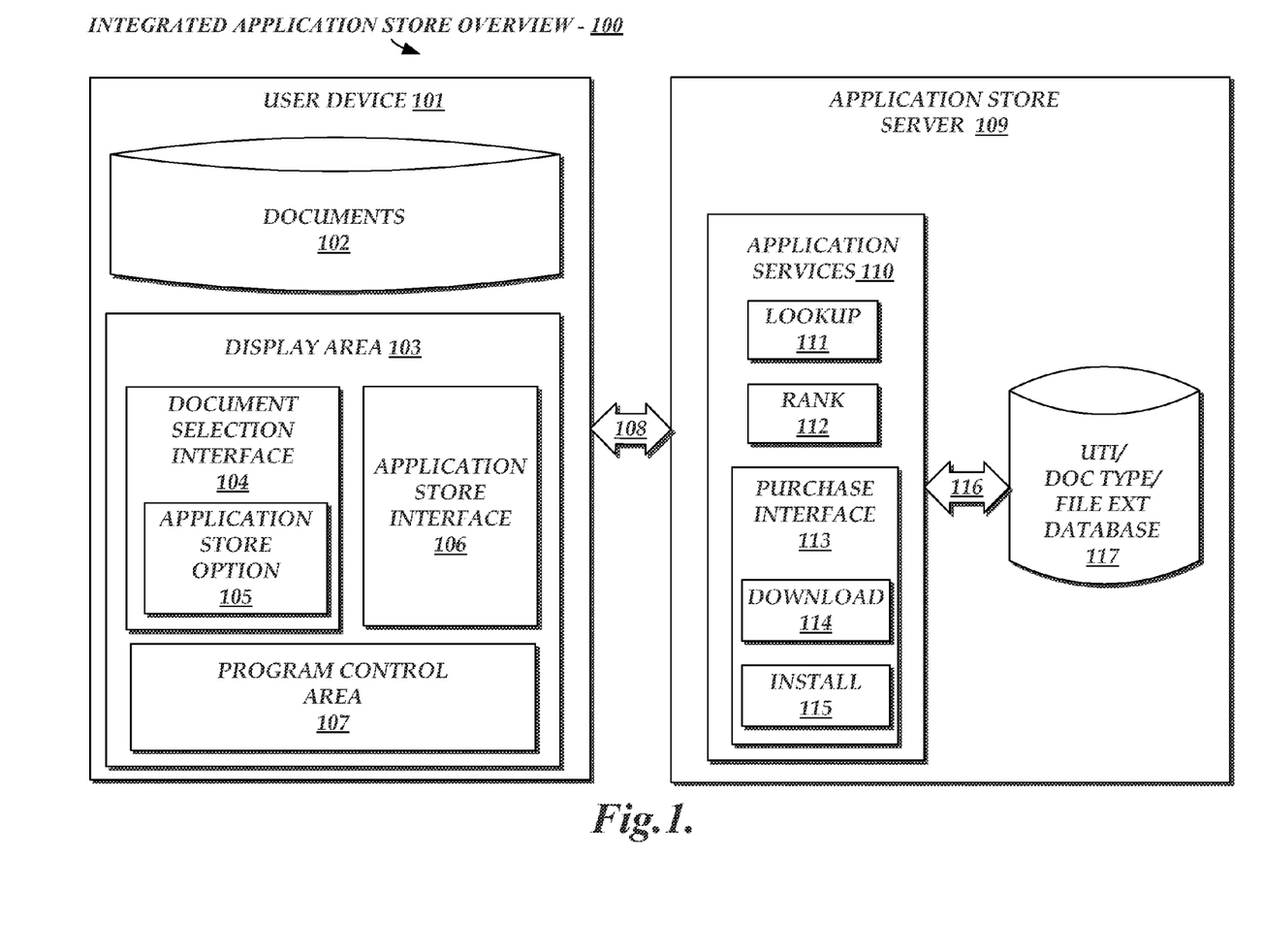
FIG. 1 is a is a block diagram of a system for an integrated application store in a data processing system or mobile computing device according to one embodiment of the present invention.

FIG. 1 shows a block diagram overview of a system 100 according to one embodiment of the present invention for integrating an application store in a user device. Examples of user interfaces that can be implemented according to this system are provided in FIGS. 2A-2C as well as FIG. 3. Examples of methods that can be implemented according to this system are provided in FIGS. 4 and 5A-5B.

The system 100 includes a user device 101 that includes a data processing system, such as a laptop or desktop computer running an operating system, such as the Macintosh or Windows operating system, or a mobile computing device, such as an iPhone, iPod Touch, iPad, running a mobile operating system, such as the iOS operating system. The user device 101 has access to documents maintained in a file system of the device's operating system, such as documents 102 stored on the user device 101 or otherwise accessible to the user device 101. The user device 101 is further equipped with a display area 103, that includes an area visible to the user and in some cases operable by the user by touch. During operation of the user device 101, the display area 103 can include a document selection interface 104 such as that generated by the Macintosh operating system's Finder program or the Windows operating system Explorer program. The user device 101 further includes an application or a document control area 107 such as the dock generated by the Macintosh operating system, or the desktop area presented by the Windows operating system, or the springboard generated by the mobile operating system iOS on smaller hand-held devices such as the iPhone.

In one embodiment, during operation of the system, the user device 101 determines that one of the documents 102 selected by the user is unknown or otherwise not usable because there is no application currently installed in the user device 101 with which to open or otherwise use the document 102. The user device 101 can initiate a process 108 (such as a background process) to communicate with an application store server 109 to determine whether an application is available for purchase and with which the document may be opened or otherwise used. The user device 101 can present a modified document selection interface 104 to display an application store option 105 along with the other options usually displayed to the user. The application store option 105 may be displayed in the form of a button or other actionable control, such as a button labeled "CHECK STORE." The user may activate the application store option 105 to activate the application store interface 106.

In one embodiment, the application store option 105 and subsequent display of the application store interface 106 in response to the user selecting the application store option 105, is only provided when the process 108 has determined that there are applications available for purchase (or otherwise available) to help the user open or otherwise use the selected document 102. In another embodiment, the application store option 105 is presented before determining that such applications are available. In the event that the user does select the application store option 105, the user device 101 displays the application store interface 106 on the display area 103 of the user device 101 in order to allow the user of the user device 101 to shop at the application store and optionally purchase or otherwise obtain an available application that will enable the device to open or otherwise use the selected document 102.

The application store server 109 provides a number of application services 110, including a lookup service 111, and rank service 112 and a purchase interface 113 comprising both a download service 114 and an install service 115. The application services 110 have access 116 to a database 117 that maps document types or file extensions to UTIs. The UTIs contain data that may be ranked for the user to facilitate the selection of an application that will best meet their needs. In one embodiment, the application services 110 are performed in conjunction with the database 117 and the application store interface 106 displayed on the user device 101.

In one embodiment, the system of FIG. 1 can be implemented through a series of document selection interfaces 104 which implement a dialog to control the selection of a document or media content, such as word processing documents, spreadsheet documents, PowerPoint slide documents, PDF documents, movie documents, music documents, HTML files, XML files, image files, etc.

Figure 2A:
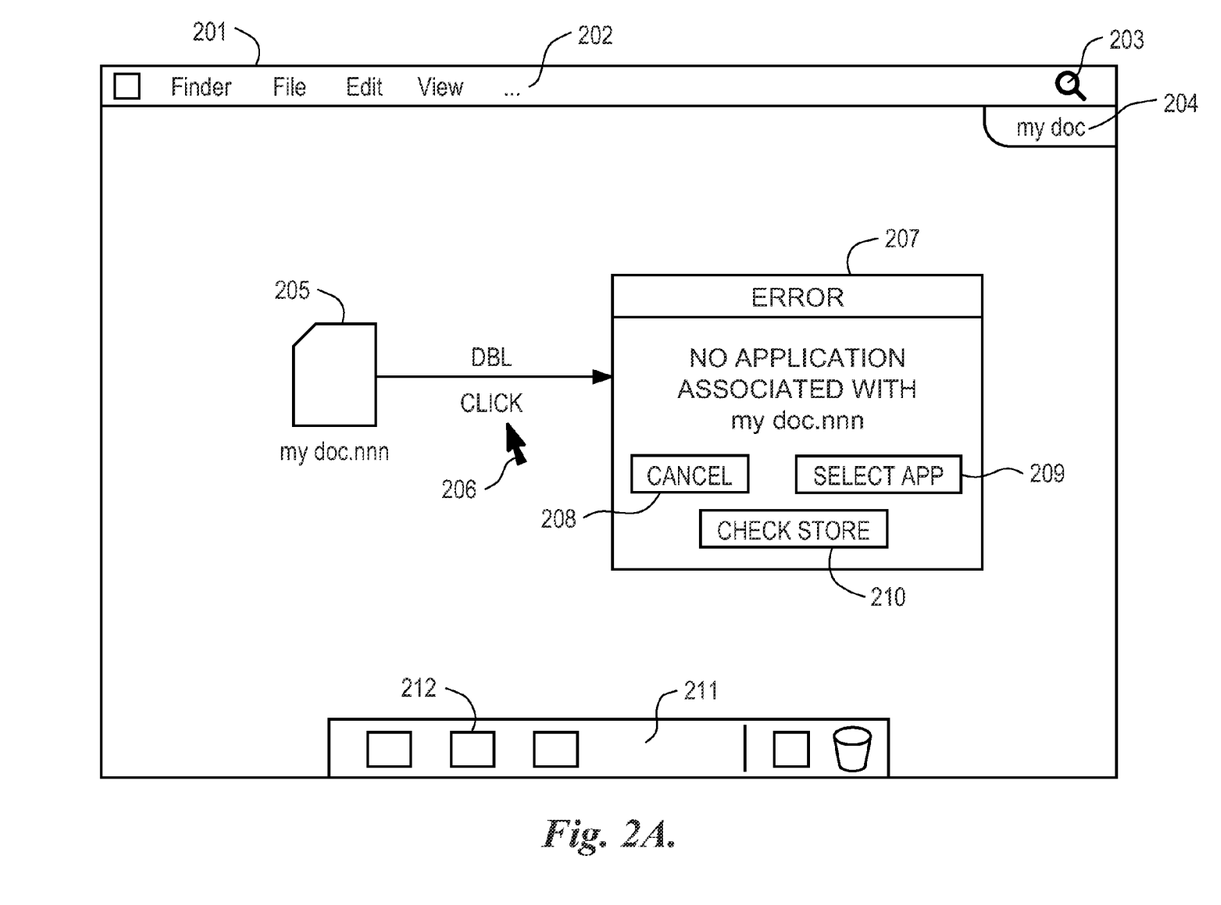
FIGS. 2A, 2B, 2C, and FIG. 3 provide an example of user interfaces which can be provided according to a system shown in FIG. 1.
Figure 2B:
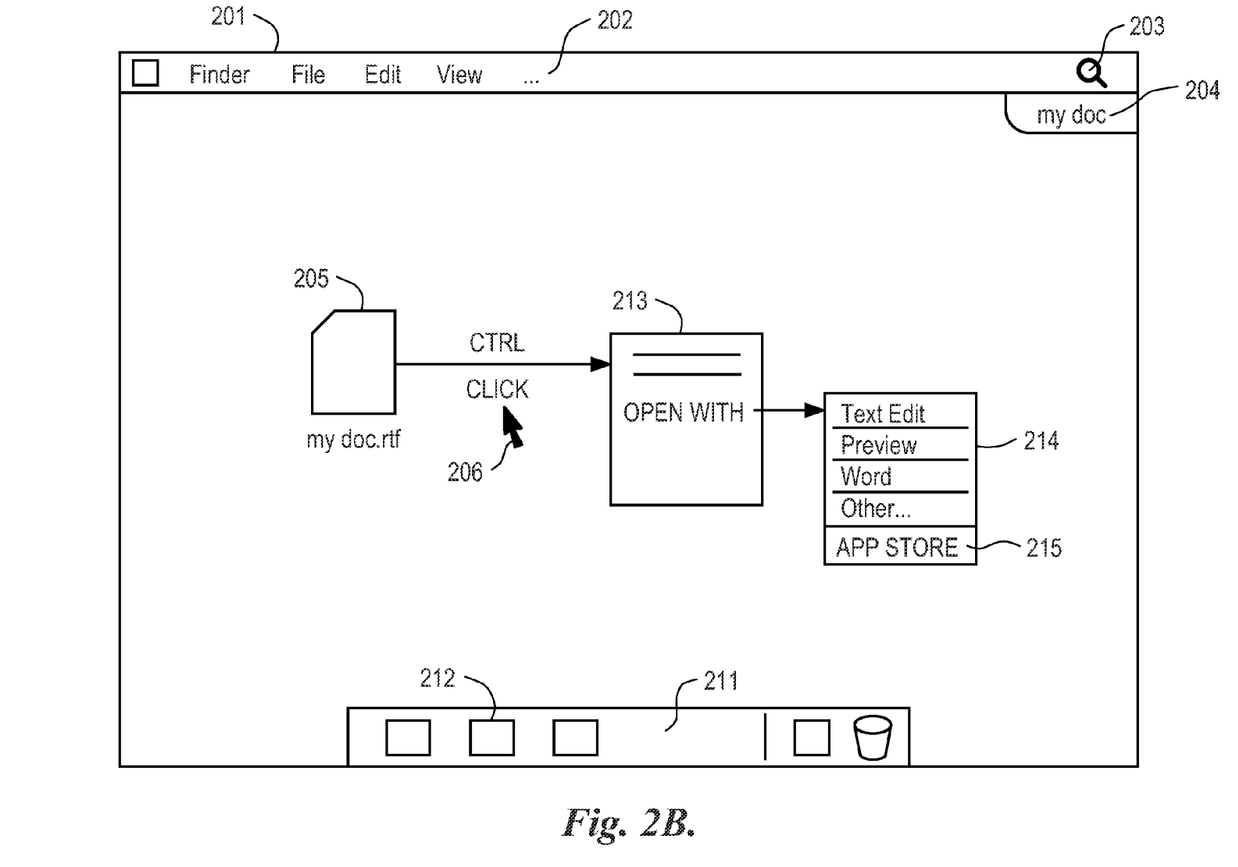
Figure 2C:
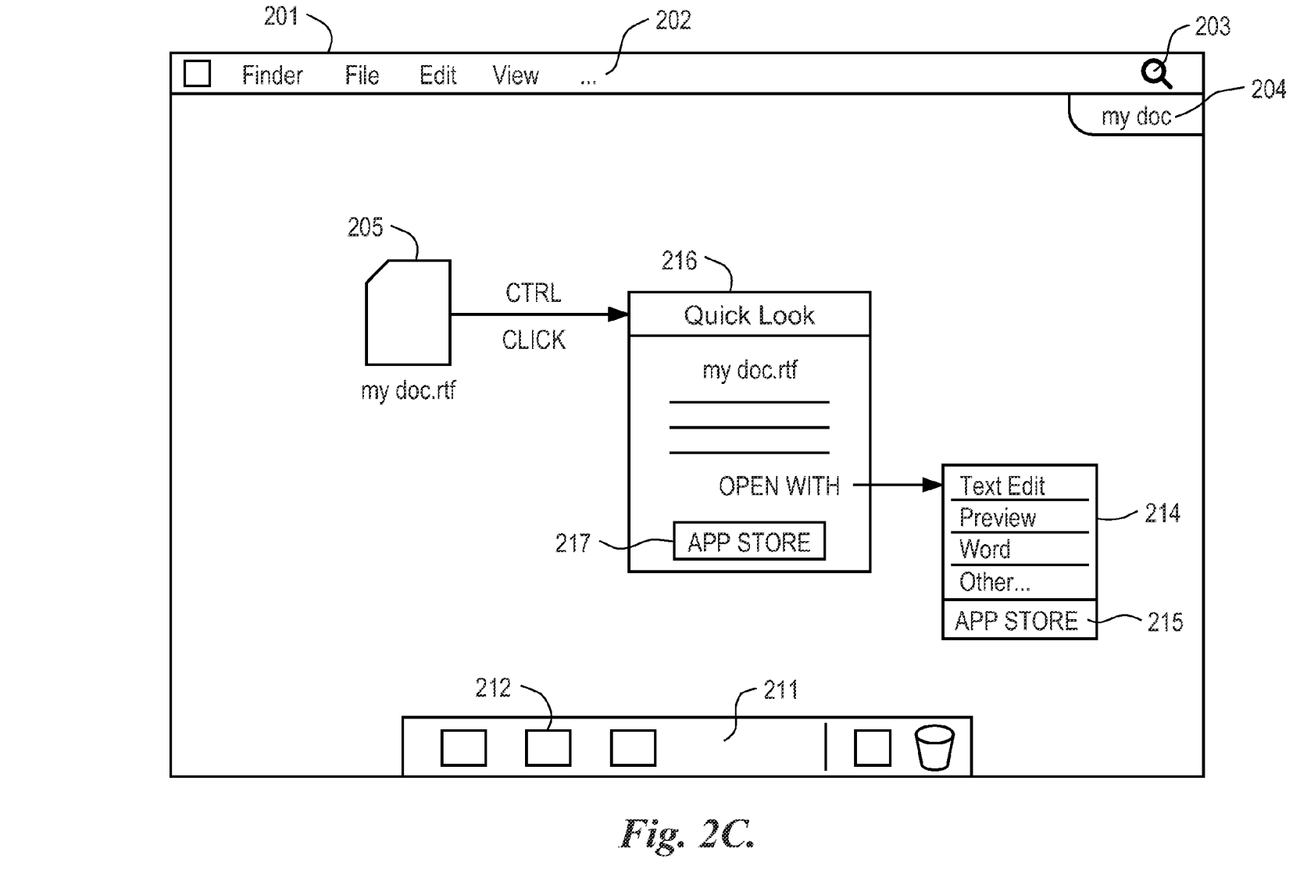

Various examples of the use of the document selection interfaces 104 to provide a navigable path to the application store interface 106 are provided in FIGS. 2A-2C. The illustrated example includes a display screen 201 which can be a liquid crystal display or other display device displaying the user interface which includes menu bar 202 which has a search request icon 203 at an edge of the display screen. The user interface also includes a document icon 205 representing a file, and this icon 205 can be present in window of a file management system user interface such as Finder or Windows Explorer or can be presented on a desktop, etc. The Finder is an example of a user interface program for a file management system in the Macintosh operating system and it is shown as the front most application by the name "Finder" in the menu bar 202 of FIG. 2A. In the embodiment shown in FIG. 2A, a cursor 206 is displayed, and this cursor can be controlled by any known cursor control device, such as a mouse or trackpad; in alternative embodiments, a touch screen or touch pad can be employed with or without a cursor, and user interaction with the system occurs through touches on the touch pad or touch screen as is known in the art. The user interface shown in FIG. 2A can also include a dock 211 which is an example of a program control area 107 disposed on the edge of a display screen. Dock 211 can include icons representing application programs which can be launched or otherwise controlled from dock 211. Icon 212 in dock 211 is an example of a program application in one embodiment.

Using the Finder interface, in one embodiment, a user can search for a document that they wish to use by entering the document name in the search input field 204 that is activated from the menu region 202 along an edge of the display screen 201, and a document icon 205 representing the search result can be displayed on the display screen 201 to provide the user with an interface for activating the document using an action such as a double click 206. Of course, other techniques to access the document may be used and the Finder interface is just one example.

In response to the selection of the document icon 205 (for example, the user double clicks on the icon or double taps on the open to attempt to open the document), the user device determines that the document type is unknown or is otherwise unable to be activated for use on the user device 101, and displays an error message to that effect in another document selection interface 104, here the pop-up window 207. In one embodiment, the pop-up window 207 displays options to either cancel 208 the selection or to manually select an app 209 with which to open the document. The pop-up window 207 is modified to further display an application store option 105 in the form of a "CHECK STORE" button 210 that, when activated, will cause the application store interface 106 to be displayed on the user device display area 103 to facilitate the purchase or retrieval of an application with which to use the selected document 102 represented by document icon 205. In one embodiment, the pop-up window 207 is only modified when a process 108 (e.g. a background process) initiated by the user device 101 receives a positive response from the lookup service 111 on the application store server 109 that at least one suitable application is available from the application store, where a suitable application is an application that is capable of running on the user device 101 for the document represented by the selected document icon 205. In another embodiment, the check store button 210 is presented before determining that such applications are available.

FIG. 2B illustrates an alternative navigable path to the application store interface 106. For example, instead of a double click, the user can enter a control click, or ctrl click, or other command directed at the document icon 205 which causes the presentation of an "Open With" option 213 that lists a menu of options 214 that has been modified to include an application store option 105 in the form of a menu selection labeled "APP STORE" 215. The menu of options 214 can include a list of one or more application programs that can open or otherwise present the document. FIG. 2C illustrates yet another navigable path to the application store interface 106. As shown, the user can enter a command after selecting the document icon 205 to enter a preview interface 216 (such as a QuickLook interface on the Macintosh) to view the document, and from there can enter an additional command within the QuickLook interface 216 to cause the presentation of the "Open With" option 213 that lists a menu of options 214 that has been modified to include an application store option 105 in the form of a menu selection labeled "APP STORE" 215. In one embodiment, the application store option 105 is included directly in the QuickLook interface 216 in the form of a button 217 labeled "APP STORE." In each case, when the "APP STORE" menu option 215 or button 217 is selected, the APP STORE application store option 105 will cause the application store interface 106 to be presented to the user, and this interface 106 can present the one or more suitable applications that were determined to be available. As with the "CHECK STORE" button 210, the "APP STORE" menu option 215 or button 217 can be presented in one embodiment, when a background process 108 initiated by the user device 101 receives a positive response from the lookup service 111 on the application store server 109 that at least one suitable application is available from the application store. In another embodiment, the "APP STORE" menu option 215 or button 217 is presented as shown in FIG. 2B or 2C before determining that at least one suitable application is available from the application store.

It should be understood that the navigable paths to the application store illustrated and described with reference to FIGS. 2A-2C are by way of example only, and that other navigable paths to the application store may be presented on the user device in accordance with embodiments of the invention. For example, in the case of a smaller display area 103 on a hand held user device 101 that is a mobile computing device, such as an iPhone device, other types of modifications of the document selection interface 104 to add an application store option 105 may be made that are touch activated or otherwise exploit the capabilities of the mobile operating system running on the user device 101. In another example, of a "Get Info" or a "Properties" command directed to a document can cause the display of a window that provides information about the document (e.g. file size, file location, file type, etc.) and can also include an "APP STORE" button to allow a user to see what applications are available to present or edit the document.

Figure 3:
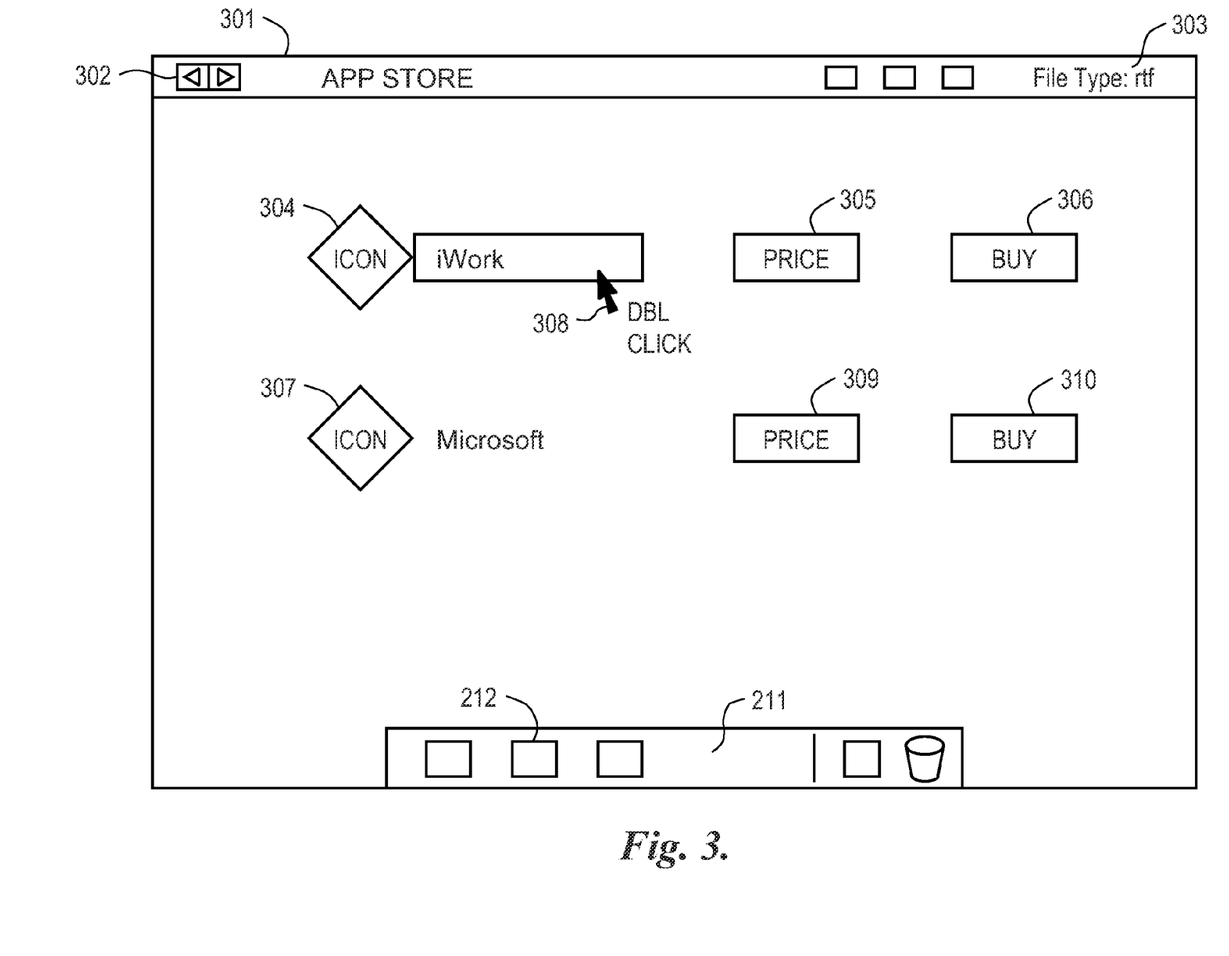

FIG. 3 illustrates an example of a application store interface 106 and document control area 107 that can be displayed on the user device 101 in response to the selection of the application store option 105 presented to the user, such as the selection of the "CHECK STORE" button 210 or the "APP STORE" menu option 215 or button 217 illustrated in the FIGS. 2A-2C. The illustrated example includes a display screen 301 which can be a liquid crystal display or other display device displaying the user interface which includes menu bar 302 which has selection arrows at the left edge to facilitate browsing the applications available for purchase on the application store, and a filetype indication 303 appearing at the opposite edge to indicate the document type that may be used with the applications being browsed, in this case the filetype "rtf." The user interface also includes application icons 304 and 307 representing the suitable applications for documents having the "rtf" filetype that have been determined to be available for purchase. Corresponding PRICE icons 305 and 309, as well as corresponding BUY icons 306 and 310 may be presented to facilitate the purchase of a suitable application. Other variations in the user interface may be presented to accommodate a smaller size of the display screen 301, such as on a smaller hand-held computing device like an iPhone. The user interface shown in FIG. 3 can also include the dock 211 as in FIGS. 2A-2C as an example of a program control area 107 disposed on the edge of the display screen. Dock 211 can include icons representing application programs which can be launched or otherwise controlled from dock 211. Icon 212 is an example of a program application in one embodiment.

While dock 211 is illustrated on the display screen 201, it can be appreciated that alternative program control areas 107 may be used, such as the springboard displayed on the iPhone. An example of such an alternative presentation of a program control area 107 is provided in Windows 7 (from Microsoft Corporation of Redmond, Wash.) with the start menu or task bar in Windows 7 at the corner of a display screen; the activation of the start menu can produce a list of programs by program name and/or icon which is similar to the dock 211.

The exemplary application store interface 106 illustrated in FIG. 3 may also indicate a ranking of the applications represented by icons 304 and 307. As shown in the illustrated example, there are two suitable applications listed as available for purchase on the application store, an iWork application represented by icon 304 and a Microsoft application represented by icon 307. The iWork application may be listed first indicating that it has been ranked higher than the Microsoft application based on various factors as determined from information obtained through the rank application service 112, including in this example information obtained from the database 117 that mapped the filetype "rtf" to the UTI for "rtf" documents. The various factors may include a ranking designated by the owner of the application (e.g.

Apple, Microsoft, or a third party developer) and the level of service provided by the application (e.g. view, read, and/or write). Other factors considered in the ranking may include the price of the application, the size of the application, and the like.

In one embodiment, upon the selection of one of the BUY icons 306 and 310, the application store interface 106 interfaces with the application store server 109 via the purchase interface 113, which in turn initiates the download 114 and install 115 services of the application store server 109 to complete the purchase. As described in further detail in co-pending published application Ser. No. 09,191,334, one of the icons 304/307 representing the application that was purchased or otherwise obtained can be animated to appear to "fly" from the area of the display screen 301 where it resides on the application store interface 106 to the area of the display screen 301 containing the program control area 107, in this case the dock 211. The icons for other applications that are already on the dock can be resized and moved to make room for the newly obtained application. Upon "landing" on the dock 211, the icon 304/307 representing the application that was purchased can, in one embodiment, appear to "bounce" and/or is semi-transparent until it is fully downloaded and installed, whereupon it stops "bouncing" and becomes opaque. In another embodiment, the icon 304/307 bounces only once after the download and installation is completed. In one embodiment, the icon 304/307 is temporarily accompanied on the dock 211 by a status bar (not shown) that marks the progress of the download and installation over time, and which disappears from view once the download and installation is complete. In this manner, the animation representing the download and installation of the application conveys the status of the application on the user device over time.

Turning now to the methods employed in the system 100 for an integrated application store illustrated in the block diagram overview of FIG. 1, and the graphical user interfaces of FIGS. 2A-2C and 3, FIG. 4 illustrates a flowchart that provides an overview of a method 400 beginning with process 401, in which the method detects whether the user has selected an unknown document type for a document selection interface 104 on the user device 101. In one embodiment process 401 also includes the ability to detect that the user has selected a document type that is known, but for which the applications currently installed on the user device are limited, such as only being able to play, view or read the document type but not able to generate or edit the document type. In process 402 the method continues by initiating access to an application store server with which the user device 101 is communicably connected in order to further initiate a lookup of the unknown document type against a database that maps document types or filetypes or file extensions and the like to a corresponding UTI, or uniform type indicator. The UTI, which may or may not be available for all document types, can provide additional information about the application, such as the ownership and level of service. In an alternative embodiment, the process 402 occurs after process 404; in other words, the look up occurs after receiving a user selection of the "CHECK STORE" or "APP STORE" menu option or button.

In one embodiment, the method 400 continues at process 403 in which the method modifies or enhances the document selection interface 104 that would normally be used on the user device 101 to access the document to add an application store option 105. The application store option 105 may take the form of a button or menu selection as described with reference to the example user interfaces described with reference to FIGS. 2A-2C. The method 400 continues with process 404 to further display an application store interface 106 on the user device 101 responsive to a user selection of the application store option 105 provided in the modified/enhanced document selection interface 104. The application store interface 106 may be displayed as described with reference to the user interface example of FIG. 3, including displaying and ranking a list of suitable applications that are determined to be available for purchase, along with interactive controls to purchase the application for download and installation on the user device 101.

Figure 4:
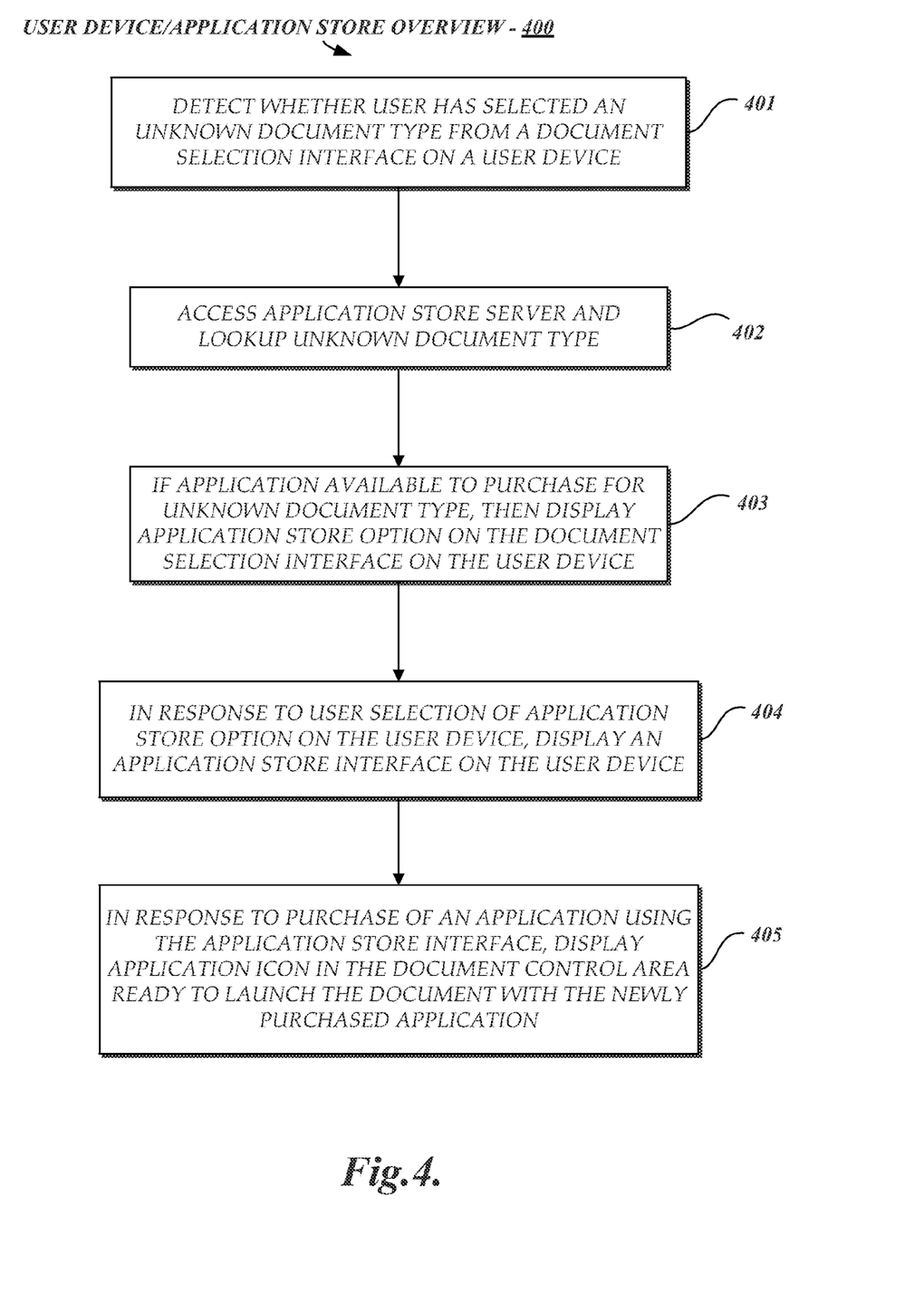
FIG. 4 is a flow chart showing an example of a method according to one embodiment of the present invention.

In one embodiment, the method 400 concludes at process 405 where, in response to the purchase of an application using the application store interface, the method causes the display of the document icon representing the document in the program control area 107. In one embodiment, and as described in detail in a co-pending application Ser. No. 09/191,334, the method causes the application icon representing the purchased or otherwise obtained application to appear as though moving or "flying" across the display area 103 from the application store interface 106 and "landing" on the program control area 107 during the download and installation of the application.

Figure 5A:
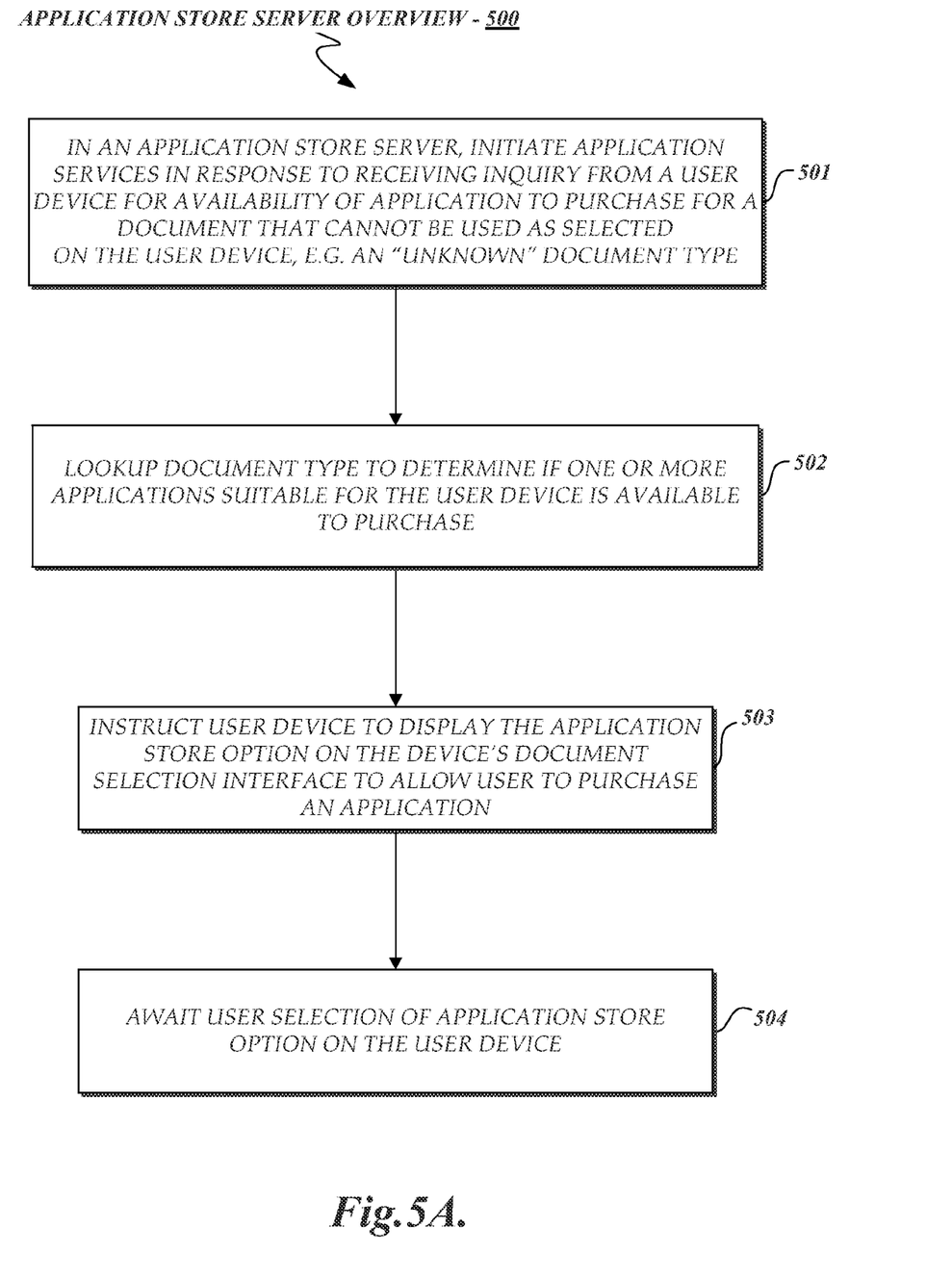
FIGS. 5A and 5B are flow charts showing a method according to another embodiment of the present invention.
Figure 5B:
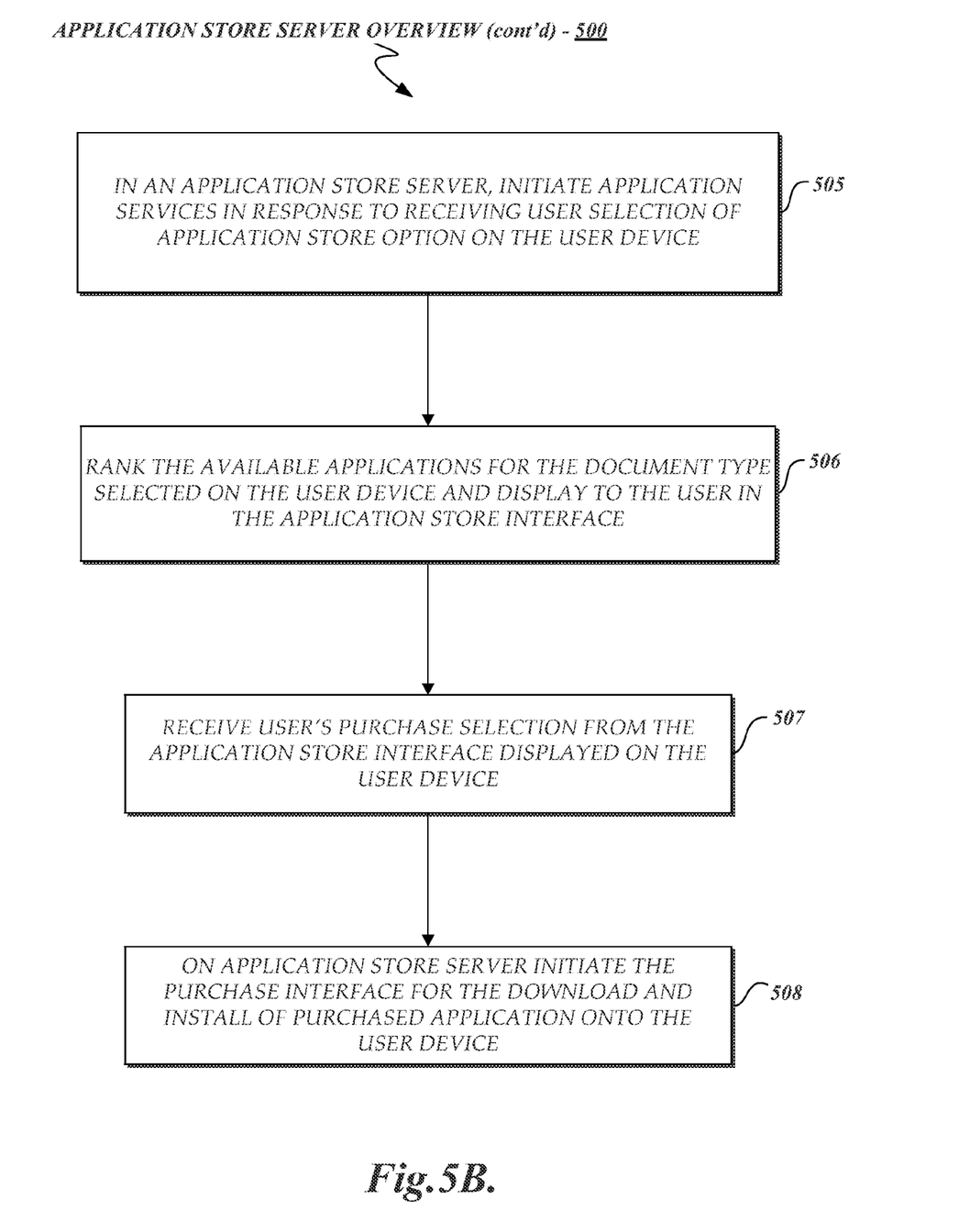

FIGS. 5A-5B illustrates a flowchart that provides an overview of a method 500 beginning with process 501, from the perspective of the application store server 109, in which the method 500 initiates application services 110 in response to receiving an inquiry from a user device 101 requesting the availability of one or more suitable applications available for purchase for an unknown document type selected on the user device. In one embodiment the document type may be known to the user device 101, but the device does not have installed an application to make use of the document in a particular manner, such as only being able to read but not edit a document. In any case, the method 500 continues at process 502, in which the method 500 initiates the lookup service 111 on the application store server 109 to determine the availability of suitable applications by accessing the database 117 that maps the document's filetype or document type, or the like, to a corresponding UTI, or uniform type indicator. If available applications are found, the method 500 proceeds at process 503 to instruct the user device 101 to display the application store option so that the user can interact with their device to purchase the application. In another embodiment, the application store option is displayed before the server performs any lookup of document types, and the server performs the lookup in response to a user selection of the application store option button or other user interface element. In one embodiment, the process 503 causes the user device 101 to modify or enhance an existing document selection interface 104 to display an additional button or other menu option, such as a CHECK STORE or APP STORE button or menu option as described with reference to the exemplary user interfaces illustrated in FIGS. 2A-2C. Upon completion of the process 503, the method 500 continues at process 504 to await user selection of an application store option 105 on the user device 101.

Turning now to FIG. 5B, the method 500 continues at process 505 in response to receiving a user selection of the application store option 105 on the user device 101 to initiate additional application services 110 to rank 112 the suitable applications that were determined to be available to purchase during the lookup service 111. The rank service 112 obtains information about the suitable applications available for purchase from the database that maps the document type or file extension, or the like, to the UTI, or uniform type indicator. The information is used to rank the display of the list of suitable applications in an order to facilitate the user's selection of the application for their user device 101. At process 507, the method 500 continues, and in which the user's purchase selection is received from the application store interface 106 displayed on the user device 101. The method 500 concludes at process 508 in which the application store server 109 initiates the services of the purchase interface 113, the download service 114 and the install service 115 to complete the purchase and facilitate the download and installation of the application on the user device 101.

In one embodiment, and as described in detail in a co-pending application Ser. No. 09/191,334, the method 500 operates in conjunction with the method 400 operating on the user device 101 to cause the application icon representing the purchased application to appear as though moving or "flying" across the display area 103 of the user device 101 from the application store interface 106 and "landing" on the program control area 107 during the download and installation of the application.

Figure 6:
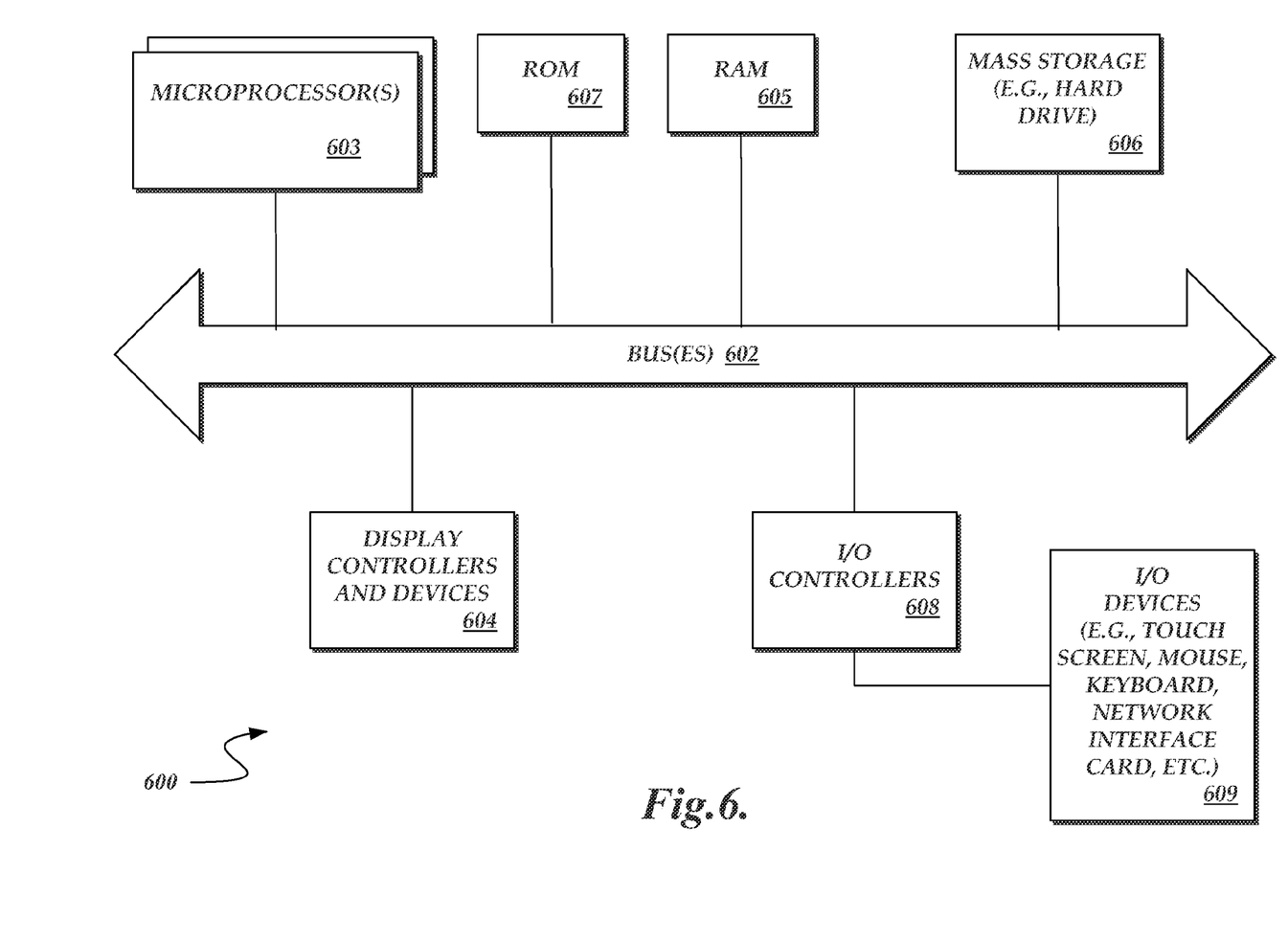
FIG. 6 shows, in block diagram form, an example of a data processing system which can be used with one or more embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 6 shows one example of a typical data processing system which may be used with the present invention. Note that while FIG. 6 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 6 may also be used with the present invention. The data processing system of FIG. 6 may be a Macintosh computer from Apple Inc. of Cupertino, Calif. As shown in FIG. 6, the data processing system 601 includes one or more buses 609 which serve to interconnect the various components of the system. One or more processors 603 are coupled to the one or more buses 609 as is known in the art. Memory 605 may be DRAM or non-volatile RAM or may be flash memory or other types of memory. This memory is coupled to the one or more buses 609 using techniques known in the art. The data processing system 601 can also include non-volatile memory 607 which may be a hard disk drive or a flash memory or a magnetic optical drive or magnetic memory or an optical drive or other types of memory systems which maintain data even after power is removed from the system. The non-volatile memory 607 and the memory 605 are both coupled to the one or more buses 609 using known interfaces and connection techniques. A display controller 611 is coupled to the one or more buses 609 in order to receive display data to be displayed on a display device 613 which can display any one of the user interface features or embodiments described herein. The display device 613 can include an integrated touch input to provide a touch screen. The data processing system 601 can also include one or more input/output (I/O) controllers 615 which provide interfaces for one or more I/O devices, such as one or more mice, touch screens, touch pads, joysticks, and other input devices including those known in the art and output devices (e.g. speakers). The input/output devices 617 are coupled through one or more I/O controllers 615 as is known in the art. While FIG. 6 shows that the non-volatile memory 607 and the memory 605 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 609 may include one or more bridges or controllers or adapters to interconnect between various buses. In one embodiment, the I/O controller 615 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 605 or the non-volatile memory 607 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computing device comprising:
    a display device;
    a processor coupled to circuitry for displaying output on the display device; and
    a memory device coupled to the processor, the memory device including instructions that, when executed by the processor, cause the computing device to:
    generate, for display on the display device, a first user interface to receive a user selection to initiate activation of a file;
    determine, based on receiving the user selection of the file, whether a first application associated with the file is installed on the computing device;
    request, from a server remote from the computing device and based on receiving the user selection of the file, a second application available to purchase for activating the file;
    modify the first user interface to include, a first option representing the first application in response to the processor determining that the first application associated with the file is installed on the computing device, and a second option representing a link to an application store interface for transacting a purchase for the second application available to purchase in response to at least the request for the second application; and
    display the application store interface, upon receiving a user selection of the second option, the application store interface presenting the second application for purchase and download to the computing device.

2. The computing device of claim 1, wherein the instructions that cause the processor to display the application store interface include instructions to display a plurality of applications for purchase and associated with the file; and
    wherein the application store interface is configured for selecting an application to purchase from among the plurality of applications based on ranking data, the ranking data including at least one of:
    a designation by an owner of the application;
    a level of service of the application, the level of service including whether the application supports functionality to view, read and/or write the file with the application;
    a purchase price of the application; and
    a size of the application.

3. The computing device of claim 1, wherein the instructions that cause the processor to request the second application include a file type of the file to enable the server to determine whether the second application is available to purchase.

4. The computing device of claim 1, wherein the instructions that cause the processor to determine whether the first application is installed on the computing device include instructions to determine that at least one other file cannot be activated with the first application because:
    the at least one other file has an unknown file type for which there is no installed application; or
    the at least one other file has a known file type for which the first application is outdated or not fully enabled.

5. The computing device of claim 1, wherein the instructions further cause the computing device to display an application icon representing the second application to convey a status of the second application on the computing device over time, the status including at least one of whether downloading the second application to the computing device is complete and whether installing the second application to the computing device is complete.

6. A method comprising:
    generating, for display on the display device of a computing device, a first user interface to receive a user selection to initiate activation of a file;
    determining, using the computing device and based on receiving the user selection of the file, that a first application associated with the file is installed on the computing device;
    requesting, from a server remote from the computing device and based on receiving the user selection of the file, a second application available to purchase for activating the file;
    modifying the first user interface to include, a first option representing the first application in response to the processor determining that the first application associated with the file is installed on the computing device, and a second option representing a link to an application store interface for transacting a purchase for the second application available to purchase in response to at least the request for the second application; and
    displaying the application store interface, upon receiving a user selection of the second option, the application store interface presenting the second application for purchase and download to the computing device.

7. The method of claim 6, further comprising displaying the application store interface and displaying a plurality of applications for purchase and associated with the file; and
    wherein the application store interface is configured for selecting an application to purchase from among the plurality of applications based on ranking data, the ranking data including at least one of:
    a designation by an owner of the application;

a level of service of the application, the level of service including whether the application supports functionality to view, read and/or write the file with the application;

a purchase price of the application; and a size of the application.

8. The method of claim 6, wherein the requesting the second application includes sending a file type to the server to enable determining whether the second application is available.

9. The method of claim 6, further comprising determining that at least one other file cannot be activated with the first application because:

the at least one other file has an unknown file type for which there is no installed application; or the at least one other file has a known file type for which the first application is outdated or not fully enabled.

10. The method of claim 6, further comprising displaying an application icon representing the second application to convey a status of the second application on the computing device over time, the status including at least one of whether downloading the second application to the computing device is complete and whether installing the second application to the computing device is complete.

11. A non-transitory computer-readable medium including executable instructions stored thereon which when executed by a computer processor cause the computer processor to perform the following operations:

generate, for display on the display device of a computing device, a first user interface to receive a user selection to initiate activation of a file;

determine, based on receiving the user selection of the file, whether a first application associated with the file is installed on the computing device;

request, from a server remote from the computing device and based on receiving the user selection of the file, a second application available to purchase for activating the file;

modify the first user interface to include, a first option representing the first application in response to the processor determining that the first application associated with the file is installed on the computing device, and a second option representing a link to an application store interface for transacting a purchase for the second application available to purchase in response to at least the request for the second application; and display the application store interface, upon receiving a user selection of the second option, the application store interface presenting the second application for purchase and download to the computing device.

12. The non-transitory computer-readable medium of claim 11, wherein the executable instructions further include instructions for displaying the application store interface and displaying a plurality of applications for purchase and associated with the file; and wherein the application store interface is configured for selecting an application to purchase from among the plurality of applications based on ranking data, the ranking data including at least one of:

a designation by an owner of the application;

a level of service of the application, the level of service including whether the application supports functionality to view, read and/or write the file with the application;

a purchase price of the application; and a size of the application.

13. The non-transitory computer-readable medium of claim 11, wherein the executable instructions further include instructions for determining whether the second application is available to purchase based on a file type of the file.

14. The non-transitory computer-readable medium of claim 11, wherein the executable instructions further include instructions for determining that at least one other file cannot be activated with the first application because:

the at least one other file has an unknown file type for which there is no installed application; or the at least one other file has a known file type for which the first application is outdated or not fully enabled.

15. The non-transitory computer-readable medium of claim 11, wherein the executable instructions further include instructions for displaying an application icon representing the second application to convey a status of the second application on the computing device over time, the status including at least one of whether downloading the second application to the computing device is complete and whether installing the second application to the computing device is complete.

* * * * *